United States Patent [19]
Martin et al.

[11] Patent Number: 5,415,509
[45] Date of Patent: May 16, 1995

[54] INFINITELY ADJUSTABLE FASTENER LOCK PLATE AND RING

[75] Inventors: Berthold Martin, Shelby Township, Macomb County; John C. Collins, Novi; William G. Teer, Grand Blanc; Steven A. Mikel, Farmington Hills, all of Mich.

[73] Assignee: Chrysler Corporation, Highland Park, Mich.

[21] Appl. No.: 165,609

[22] Filed: Dec. 13, 1993

[51] Int. Cl.⁶ .................................. F16B 19/10
[52] U.S. Cl. ...................... 411/123; 411/88; 411/96; 403/315
[58] Field of Search ................... 411/88–96, 411/122–124, 130, 131, 966, 971; 74/434, 405, 395; 403/315, 316, 319, 320, 258, 260

[56] References Cited

U.S. PATENT DOCUMENTS

| | | | |
|---|---|---|---|
| 183,873 | 10/1876 | Thompson | 411/123 |
| 534,876 | 2/1895 | Hanvey | 411/123 |
| 3,523,709 | 8/1970 | Heggy | 411/122 |
| 3,727,969 | 4/1973 | Eddy | 411/96 |
| 4,034,946 | 7/1977 | Zimmer | 403/315 |
| 4,692,053 | 9/1987 | Sampedro | 403/315 |
| 4,781,502 | 11/1988 | Kushnick | 411/87 |
| 4,885,834 | 12/1989 | Beerman | 411/96 |
| 5,049,017 | 9/1991 | Reynolds | 411/432 |
| 5,094,117 | 3/1992 | Mikel et al. | 74/395 |

FOREIGN PATENT DOCUMENTS 2229241 9/1990 United Kingdom ............ 411/88

*Primary Examiner*—Flemming Saether
*Attorney, Agent, or Firm*—Christopher A. Taravella

[57] ABSTRACT

An improved lock plate and retaining ring mounting arrangement for securing a gear on a vehicle rotating shaft by a threaded hex-head fastener. The plate has a generally rectangular central aperture with transversely opposed internal side edges and longitudinally opposed arcuate end edges. The plate has a pair of arcuate opposed concentric slots sized to adjustably receive an associated web bolt for threaded reception in a web bore thereby locking the shaft fastener in its tightened position. A one-piece retaining ring, concentrically positioned so as to overly the plate, comprises opposed semicircular bands interconnecting a pair of diametrically opposed discs provided with a bolt hole adapted aligned with both an associated plate slot and a web bore. Each disc is formed with a plurality of radially disposed tabs whereby at least one of the tabs is in substantial registration with a side face of an associated web bolt head. The one tab is bendable from a planar position to a locking position in substantial flatwise contact with its registered web bolt side face thereby locking the bolt in its tightened position.

5 Claims, 2 Drawing Sheets

INFINITELY ADJUSTABLE FASTENER LOCK PLATE AND RING

BACKGROUND OF THE INVENTION

This invention relates to a lock plates used with threaded fasteners and more particularly to an improved two-piece infinitely adjustable lock plate and retaining ring arrangement for a threaded fastener.

The present invention is an improvement over U.S. Pat. No. 5,094,117 issued Mar. 10, 1992 to Mikel et al. entitled Infinitely Adjustable Bolt Locking Plate, assigned to the assignee of the subject application. The '117 patent disclosed a lock plate for a hex-head gear mounting bolt having a longitudinal axis of symmetry along which a generally rectangular central aperture extends. The aperture has transversely opposed internal side edges and longitudinally opposed arcuate end edges. A pair of spaced apart longitudinal side straps are offset upwardly from the flat plate. The plate provides a pair of opposite end bases defining a pair of mirror image arcuate slots having a common center of curvature on the plate longitudinal axis. The aperture internal side edges contact opposite side flanks of the gear bolt hex-head enabling web retaining bolts to be received in each plate base arcuate slot and an underlying one of a pair of diametrically opposed threaded web bores. Upon driving the pair of web bolts, the gear retaining bolt is prevented from backing off from its tightened position.

SUMMARY OF THE INVENTION

It is an object of the present invention to provide an improved two-piece lock plate and retaining ring arrangement for locking the head of a threaded central bolt wherein the arrangement is infinitely adjustable for ready assembly line installation on a vehicle.

It is another object of the present invention to provide an improved two-piece lock plate and retaining ring arrangement as set forth above wherein the arrangement is particularly suited for a vehicle transmission shaft drive gear central bolt obviating the backing off of the central bolt from the shaft upon a bendable tab on the ring being bent into flatwise engagement with a registered side flank of an associated retaining hex-head web bolt.

DESCRIPTION OF THE DRAWINGS

These and other features, objects and advantages of the invention will become apparent upon consideration of the specification and appended claims in which:

DETAILED DESCRIPTION OF THE INVENTION

Figure 3:
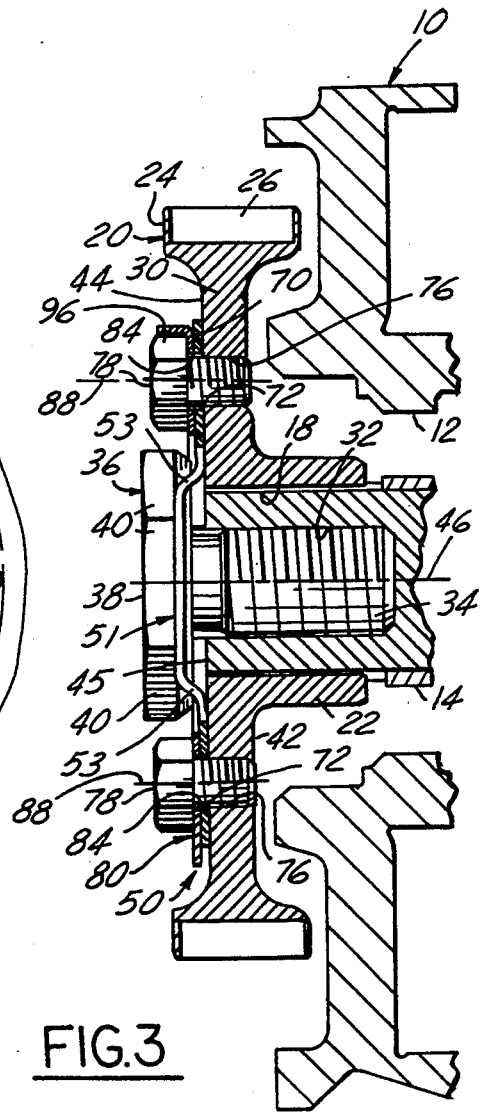
FIG. 3 is a fragmentary vertical sectional view taken on the line 3—3 of FIG. 2.

Turning now to the drawings, FIG. 3 shows a transmission housing, partially indicated at 10, formed with a circular opening 12 at one end thereof. The opening 12 is sized to concentrically receive therethrough the output end of a transmission drive shaft 14. The end portion 16 of the drive shaft 14 has external splines engaged with an internally splined central axial bore 18 of a transmission helical drive gear, generally indicated at 20. The drive gear 20 is formed with a central hub 22 rotatably supported in the transmission end opening 12 by suitably means such as a roller bearing unit (not shown).

Figure 1:
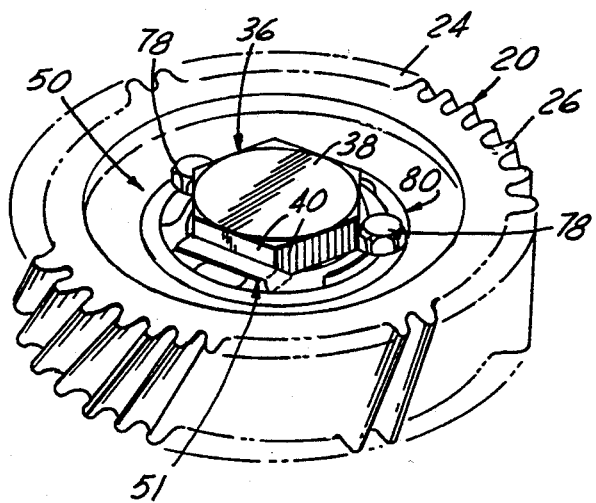
FIG. 1 is a perspective view showing a helical gear secured on the end of a drive shaft by a two-piece ring and plate gear bolt locking retainer of the present invention.
Figure 2A:
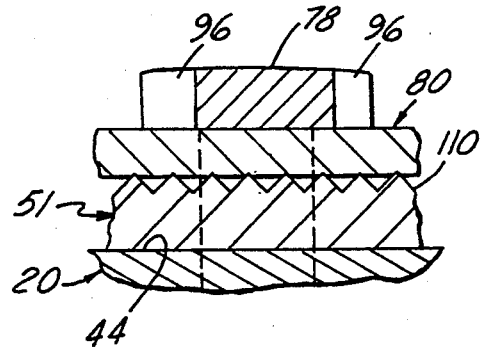
FIG. 2A is an enlarged fragmentary side view looking in the direction of line 2A—2A of FIG. 2.
Figure 2:
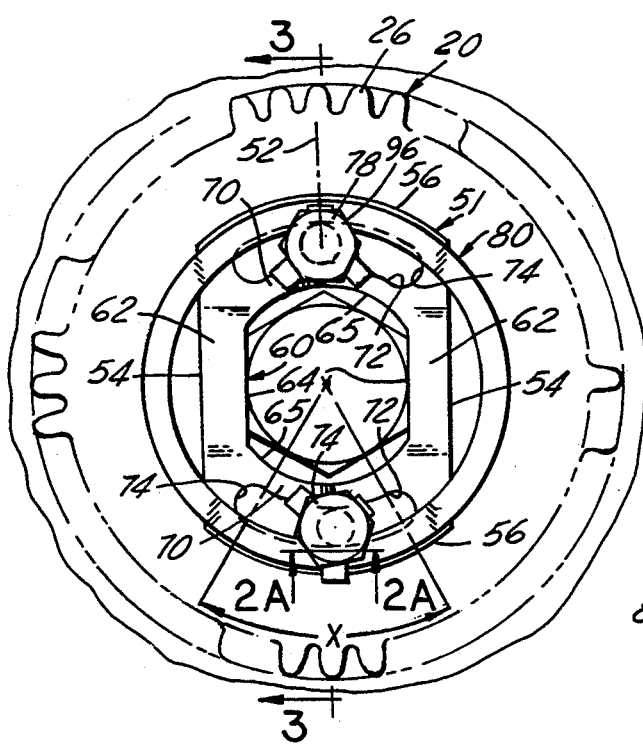
FIG. 2 is a plan phantom view in of the gear face showing the two-piece locking arrangement securing a bolt on the end of a shaft journally supported in a transmission housing.

As seen in FIGS. 1 and 2, the drive gear 20 includes an outer rim 24, formed with gear teeth 26, with the rim joined to the central hub by intermediate web 30. The shaft one end thereof 16 has a central internally threaded shaft bore 32 adapted to receive threaded shank 34 of a central bolt 36 having a conventional hex-head 38 defining six wrench-engagable vertical side flanks 40. It will be noted the gear hub 22 extends axially from one inner face 42 of the gear web while outer face 44 of the gear web is substantially flush with the shaft end face 45. Upon the central bolt 36 being threadably inserted in the shaft axial bore 34 and torqued down, the gear 20 is fixedly retained on the transmission drive shaft 14 for rotation therewith about the principal axis 46 of the shaft.

The present invention provides an improved lock plate and retaining ring arrangement, generally indicated at 50 in FIGS. 1–3, to insure that the central shaft bolt 36 is not subject to being loosened by vibration, centrifugal force, shock, etc. As seen in FIG. 1, the lock plate 51, which is preferably stamped from sheet material such as rigid sheet steel, is a planar generally rectangular-shaped plate having a major longitudinal axis of symmetry 52. The lock plate 51 is defined by parallel outer side edges 54 and arcuate fore and aft mirror image end edges 56—56 the radius of each having a common center of curvature 58 located on the major longitudinal axis 52.

Figure 9:
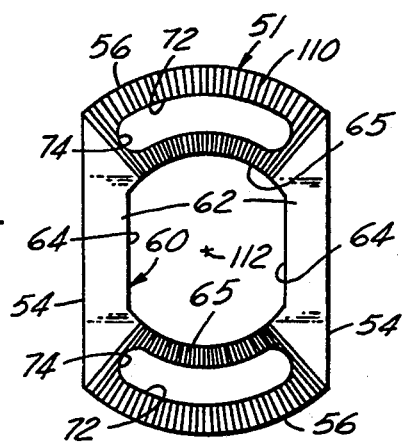
FIG. 9 is a detail plan view to the gear locking plate.

With reference to FIGS. 2 and 9, the lock plate 51 is stamped with a central elongated aperture 60 extending parallel to the longitudinal axis 52. The central aperture defines two parallel pairs of longitudinal side straps 62 transversely spaced apart and bent upwardly from the flat plate defining sloped riser portions 63 (FIG. 3). The side straps are thus spaced a predetermined dimension from the plane of the retainer plate 51. The central aperture 60 is defined by a pair of longitudinally extending opposed internal side edges 64—64 and a pair of opposed arcuate end edges 65—65. It will be noted that each aperture internal side edge 64 is substantially coextensive with its associated strap, which strap extends longitudinally between each strap 62 pair of sloped riser portions 63.

The central aperture opposed arcuate internal end edges 65 define with their associated retainer plate outer end edges 56 longitudinally spaced apart pairs of arcuate-shaped bases 70. Each end base 70 is formed with an arcuate slot 72 having curved ends 74 matching the curvature of each of a pair of diametrically opposed mirror image web bores 76 (FIG. 2) in its outer face 44. As seen in FIG. 1, each base arcuate slot 72 has a common center of curvature located at the plate midpoint 58 and subtends a central acute angle of curvature "X" of the order of 62 degrees. Further, each of the base slots 72 has a predetermined radial width substantially equal to but slightly greater than the diameter of the web bores 76.

The central aperture 60 internal side edges 64 are spaced a predetermined transverse dimension apart substantially equal to but slightly greater than the dimension between opposite pairs of central hex-head flats 40—40. Accordingly, the central bolt hex-head 38, upon being tightened, is adapted to be received in the central aperture 60 such that a pair of opposite hex-head side flanks 40 are juxtaposed an associated central aperture internal side edge 64. With reference to FIGS. 2 and 3, it will be appreciated that each gear web bore 76 is aligned with an associated plate base slot 72. A pair of hex-head bolts 78, having six head side faces 79, are threaded into an associated one of the web bores 76, the central shaft bolt 36 is fixedly retained by the locking 51 plate against loosening.

Figure 6:
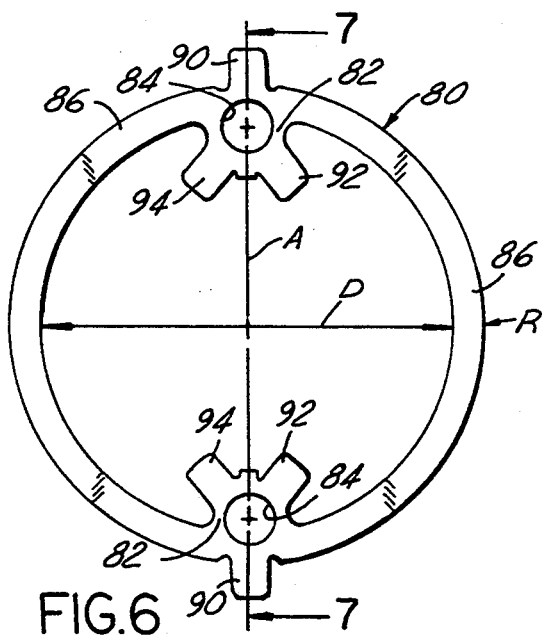
FIG. 6 is a detail plan view of the retaining ring of the present invention.
Figure 7:
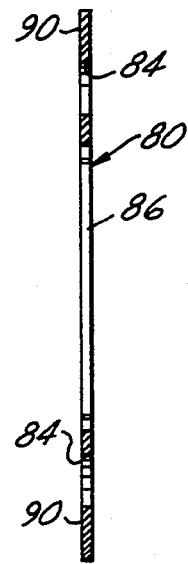
FIG. 7 is a vertical sectional view taken on the line 7—7 of FIG. 6.

To insure against either one or both of the satellite web bolts 78 being loosened, applicants' provide a unique one-piece retaining ring, generally indicated at 80. As best seen in FIG. 6, the retaining ring 80 is initially formed flat from sheet metal and comprises a pair of diametrically opposed mirror image discs 82—82 each having a bolt hole 84 aligned on diametrical axis "A". The discs 82 are interconnected by a pair mirror image opposed semicircular bands 86 sized to align the center of each disc bolt hole 84 on a respective gear bore axis 88, as seen in FIG. 3. The retaining ring has a predetermined internal diameter "D" of the order of 70 mm and a predetermined radial dimension "R" of the order of 5 mm.

Figure 8:
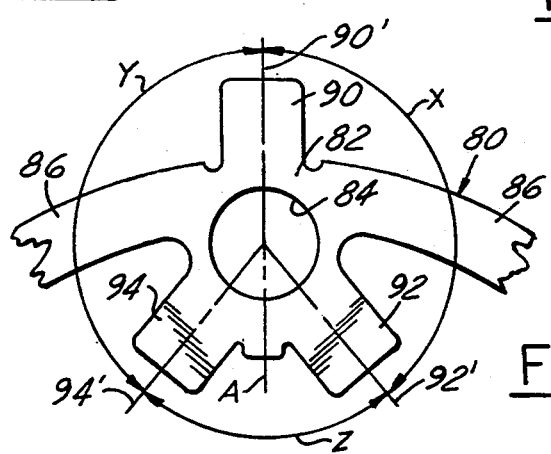
FIG. 8 is an enlarged fragmentary detail plan view of a retaining ring denoting the angular relationship of its three radially extending anti-back off tabs.

With reference to FIG. 8, it will be seen that each disc 82 is formed with three radial bendable tabs 90, 92 and 94 spaced at predetermined arcuate angles. Thus, adjacent pair of tabs 90–92 and 90–94 have their respective radial center lines 90'–92' and 90'–94' spaced at first predetermined equal obtuse angles "X" and "Y". In the disclosed embodiment angles "X" and "Y" are each of the order of 140 degrees. The adjacent pair of tabs 92–90 and 94–90 have their respective radial center lines 92' and 94' spaced at a second predetermined acute angle "Z" which in the disclosed embodiment is of the order of 80 degrees.

Figure 4:
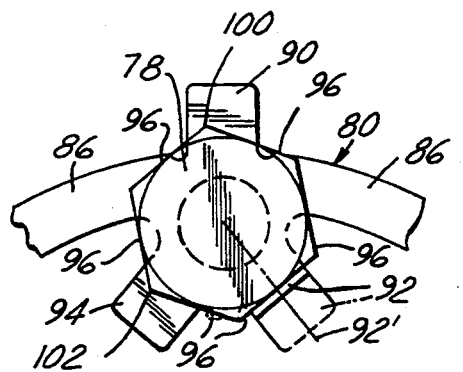
FIG. 4 is a fragmentary plane view of a portion of the retaining ring showing one of a pair of integral ring discs with its associated bolt hex head being retained by an anti-back off bendable tab.

As seen in FIG. 4, with one web bolt 78 torqued to a certain angle of turn, its hex head has one head side face 96 oriented substantially normal to tab central axis 92'. Thus, as seen in FIG. 4, the bolt head face junctures 100 and 102 overlie respective tabs 90 and 94 preventing tabs 90 and 94 from being bent substantially ninety degrees from the plane of the ring 80 for flush contact with an associated bolt head faces 96. As a consequence, however, the remaining tab 92 is oriented such that it is readily bendable by a suitable tool substantially at a right angle from its planar dashed line position to an upstanding full-line position clamping in a flatwise or flush manner an associated bolt face 96. The bent tab 92 prevents backing off or un-threading of the web bolt 78, caused by vibration or the like, in the event the bolt 78 is not fully torqued down into its bore 76.

Figure 5:
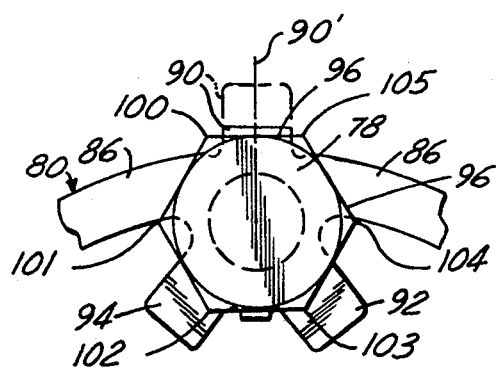
FIG. 5 is a view similar to FIG. 4 showing a retaining ring holding a bolt hex-head having a different angle of turn.

FIG. 5 illustrates a web bolt 78 rotated to a position wherein both of the bolt head junctures 103 and 102 overlie associated planar tabs 92 or 94. At such a bolt orientation, it will be seen that the remaining tab 90 is bendable between its planar dashed-line position and a full-line flush position clamping an associated bolt face 96. It will be appreciated that the unique arrangement of the three radial tabs 90, 92, or 94 insures that one of the three tabs will be oriented for ready bendable flatwise contact with a bolt head face 96.

With reference to FIG. 9, it will be seen that the upper surface of the locking plate 51 is formed with mirror image sets of serrations 110. Each set of serrations radiates from the concentric center 112 of the radius of curvature defining the arcuate edges 56 of the plate. It will be appreciated that upon tightening each of the web bolts 78 the serrations 110 are caused to bite into the opposed underside of the retaining ring bands 86 such that the plate 51 and ring 80 are locked against relative sliding movement.

Although only one embodiment of the invention has been illustrated and described, it is apparent that modifications and variations will readily come to mind of a person skilled in the art which modifications and variations do not fall outside the scope of the invention as defined in the following appended claims.

What is claimed is:

1. In a mounting arrangement for securing a rotatable member on one free end of a shaft by means of a fastener having a shank received in a threaded shaft bore aligned on the shaft principal axis, said member having a web portion formed with a plurality axial bores, a lock plate provided with a central aperture formed with opposed parallel side edges such that the fastener having a head with a pair of opposite side flanks adapted for engagement by respective aperture side edges, said plate having a plurality of arcuate concentric slots, each said slot sized to adjustably receive a web bolt shank therethrough for threaded insertion in an associated web bore, the improvement providing retaining means for obviating backing-off of the web bolts comprising:

a flat one-piece ring concentrically positioned relative to the shaft axis in an overlying flush manner on an exterior surface of said plate, said ring comprising a plurality of semicircular bands interconnecting a corresponding plurality of discs;

each said disc formed with a centered bolt hole of predetermined size, said ring being movable on the plate into a position with its center aligned on the shaft axis, and wherein each said disc overlies an associated plate arcuate concentrically disposed slot such that its bolt hole is concentric with an associated web bore;

each said disc formed with a plurality of radially disposed bendable tabs whereby at least one of said tabs is in substantial registration with one side face of its associated web bolt head so as to be bendable from an initial planar position to a locking position in substantially flatwise contact with the web bolt one side face thereby locking the web bolt against rotation.

2. The mounting arrangement as set forth in claim 1 wherein said plurality of web bores comprising a pair of diametrically opposite bores, and wherein said retaining ring comprising a pair of opposed semicircular bands interconnecting a pair of diametrically opposed mirror image discs.

3. The mounting arrangement as set forth in claim 2 wherein each said disc formed with three radially disposed bendable tabs circumferentially spaced at predetermined angles, and said web bolt being a hexagon headed bolt such that one of said tabs is in substantial registration with one side face of its associated web bolt head.

4. The mounting arrangement as set forth in claim 3 wherein each said disc having one tab extending radially outward from its associated disc center and is symmetrically disposed on a ring diametrical axis which includes the center of each of said pair of discs, and wherein each said disc having a pair of tabs extending radially inward therefrom and symmetrically disposed about said ring diametrical axis such that radial center lines of said pair of tabs defining a predetermined acute angle of the order of eighty degrees.

5. The mounting arrangement as set forth in claim 1 wherein said lock plate exterior surface formed with diametrically opposed sets of radial serrations emanating from the concentric center of said lock plate aperture, each said set of serrations adapted to bite into an opposed surface of said ring upon torquing down an associated web bolt thereby obviating relative sliding movement between the plate and ring.

* * * * *